(12) United States Patent
Gold et al.

(10) Patent No.: US 7,191,315 B2
(45) Date of Patent: Mar. 13, 2007

(54) METHOD AND SYSTEM FOR TRACKING AND RECYCLING PHYSICAL REGISTER ASSIGNMENT

(75) Inventors: Spencer M. Gold, Pepperell, MA (US); Julie M. Staraitis, Ayer, MA (US); Masooma Bhiawala, Boxboro, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 619 days.

(21) Appl. No.: 09/874,173

(22) Filed: Jun. 4, 2001

(65) Prior Publication Data

US 2002/0184473 A1   Dec. 5, 2002

(51) Int. Cl.
  *G06F 9/00*   (2006.01)
(52) U.S. Cl. .................................... 712/217
(58) Field of Classification Search ............ 712/23, 712/217
  See application file for complete search history.

(56) References Cited

U.S. PATENT DOCUMENTS 5,546,554 A   8/1996 Yung et al. ............ 395/413
5,758,112 A *  5/1998 Yeager et al. ........... 712/217
6,108,771 A *  8/2000 Gaertner et al. .......... 712/217
6,505,293 B1 * 1/2003 Jourdan et al. ........... 712/217

FOREIGN PATENT DOCUMENTS

| EP | 463628 A2 | 1/1992 |
| EP | 463628 A3 | 1/1992 |
| EP | 600611 A2 | 6/1994 |
| EP | 600611 A3 | 6/1994 |
| EP | 730225 A2 | 9/1996 |
| EP | 730225 A3 | 9/1996 |

OTHER PUBLICATIONS

Tanenbaum, "Structured Computer Organization, 2nd Edition," 1984, p. 11.*
Eggers et al., "Simultaneous Multithreading: A Platform for Next-generation Processors," 1997, pp. 1-15.*

* cited by examiner

*Primary Examiner*—Eddie Chan
*Assistant Examiner*—David J. Huisman
(74) *Attorney, Agent, or Firm*—Chapin IP Law, LLC; Barry W. Chapin, Esq.

(57) ABSTRACT

The present invention provides methods and memory structures for efficient tracking and recycling of physical register assignments. The disclosed methods and memory structures each provide an approach to reduce the size of the memory structures needed to track the usage of the physical registers and the recycling of these registers.

20 Claims, 4 Drawing Sheets

METHOD AND SYSTEM FOR TRACKING AND RECYCLING PHYSICAL REGISTER ASSIGNMENT

TECHNICAL FIELD

The present invention relates generally to managing physical register usage and more particularly to a method and system for managing physical registers by reducing the sizes of the memory structures necessary for tracking and recycling the physical register assignments.

BACKGROUND OF THE INVENTION

Most microprocessors contain registers that are used in executing instructions. When the microprocessors execute instructions, data values are read from the registers and results of operations are written into the registers. For example, the instruction "ADD R1, R2, and R3" adds the values held in resisters R1 and R2 and puts the resulting sum into register R3. R1, R2, and R3 are identifiers associated with respective registers.

Traditional microprocessors sequentially execute instructions in a computer program (i.e., in the order that the instructions appear in the computer program). In the simplest case, an instruction is executed per a clock cycle. Many instructions, however, may take more than one clock cycle to execute.

Superscalar processors, in contrast to traditional microprocessors, may issue and receive multiple instructions per clock cycle. With such processors, an instruction can be executed in a single clock cycle if there are no data dependencies, procedural dependencies, or resource conflicts that prevent execution of the instruction.

High performance processors use out-of-order processing, that is the processors process the instructions non-sequentially. Such high performance processors typically do not have a fixed relationship between a register identified and the physical register referenced by the identifier. Thus, the identifier R1 may refer to a first physical register in one instruction and refer to a second physical register in another instruction. The identifiers reference logical resisters that are mapped to corresponding physical registers.

One challenge with such processors is to manage and track the usage of register values. One conventional approach is to define an in-order state for each register. For example, if an instruction has been executed and all other previous instructions have also been executed, the values generated by the instructions are stored as the register's in-order state. The instruction is then considered "retired".

Another conventional approach to tracking and recycling physical register mappings is to create a single large structure to do all the work associated with tracking physical registers mappings. Such a structure would have to have one entry for each physical register. Each entry would have to contain information about that register's current status, i.e., whether it's free or in use. Maintaining the data in such a structure would be very complex because simultaneous reading and updating would have to be supported. Considering the size, it would be very prohibitive to make such a technique work effectively. Such a technique would require to much area, too much power, and would add too much complexity. This technique was conceivable in the past because the number of physical registers that were supported was much lower. With the advent of out of order processors, the number of supported physical registers has sky-rocketed.

There are a variety of different solutions that utilize separate register files for holding register values. The transient values of the registers can be stored in the reader buffer or an instruction window, or a temporary register array. The major problem is that register values are transferred from transient register storage to a register array or a register file holding the in-order register values.

The other aforementioned concepts are not efficient in handling the monitoring and tracking of physical registers. Therefore, there is a need to find a way to reduce the size of the memory structures needed for tracking and regulating the physical register assignments.

SUMMARY OF THE INVENTION

The present invention addresses the above-described limitation by providing memory structures for efficient tracking and recycling of physical register assignments. This approach reduces the size of the memory structures needed to track the usage of physical registers and the recycling of these registers.

In accordance with one aspect of the present invention, a method is provided in a microprocessor for managing a plurality of registers. In accordance with this method, a first structure is provided for holding information that identifies available physical registers that are free to be assigned to a plurality of destination operands for instructions executing in the microprocessor. The plurality of destination operands identifies where data resulting from an operation is to be stored. Also, the method comprises storing a physical register assignment in a second structure noting that a selected one of the physical registers is assigned to one of the plurality of destination operands for a selected instruction executing on the microprocessor. The method further comprises providing a third structure for holding information regarding available physical registers not utilized during execution of instructions.

In accordance with another aspect of the present invention, a method is practiced in a microprocessor for managing a plurality of registers. In accordance with this method, a first structure is provided for holding information identifying available physical registers that are free to be assigned as a destination operand for instructions executing on the microprocessor. The destination operand identifies where data resulting from an operation is to be stored. A physical register assignment is stored in a second structure. The physical register assignment identifies that a selected one of the physical registers is assigned as a destination operand for a selected instruction executing on the microprocessor. A third structure is provided for holding information regarding available physical registers not utilized during execution of instructions. The physical register assignments of the selected physical registers are transferred from the second structure to the third structure after retirement of the selected instruction.

In accordance with another aspect of the present invention, a microprocessor system having a plurality of physical registers for managing a plurality of physical register assignments is provided. The microprocessor includes a first module for providing a first structure for holding information identifying available physical registers that are free to be assigned as a destination operand for instructions executing on the microprocessor. The destination operand identifies where data resulting from an operation is to be stored. Also, the microprocessor includes a second module for storing a physical register assignment in a second structure noting that a selected one of the physical registers is assigned as a destination operand for a selected instruction executing on the microprocessor. The microprocessor includes a third module for providing a third structure for holding information regarding available physical registers not utilized during execution of instructions. The microprocessor also includes a first interface for transferring said physical register assignment of said selected physical register from said second structure to said third structure after retirement of said selected instruction, and a second interface for, when said selected physical register is assigned as a destination operand for a subsequent instruction, transferring information identifying said selected physical register as available to said first structure.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention provides a microprocessor having a plurality of physical registers and data structures to track and recycle the physical registers. The data structures facilitate efficient management of the registers without hampering performance of the microprocessor. The data structures do not increase the memory requirements for tracking the various physical registers. As such, memory is conserved for other processing purposes.

Figure 1:
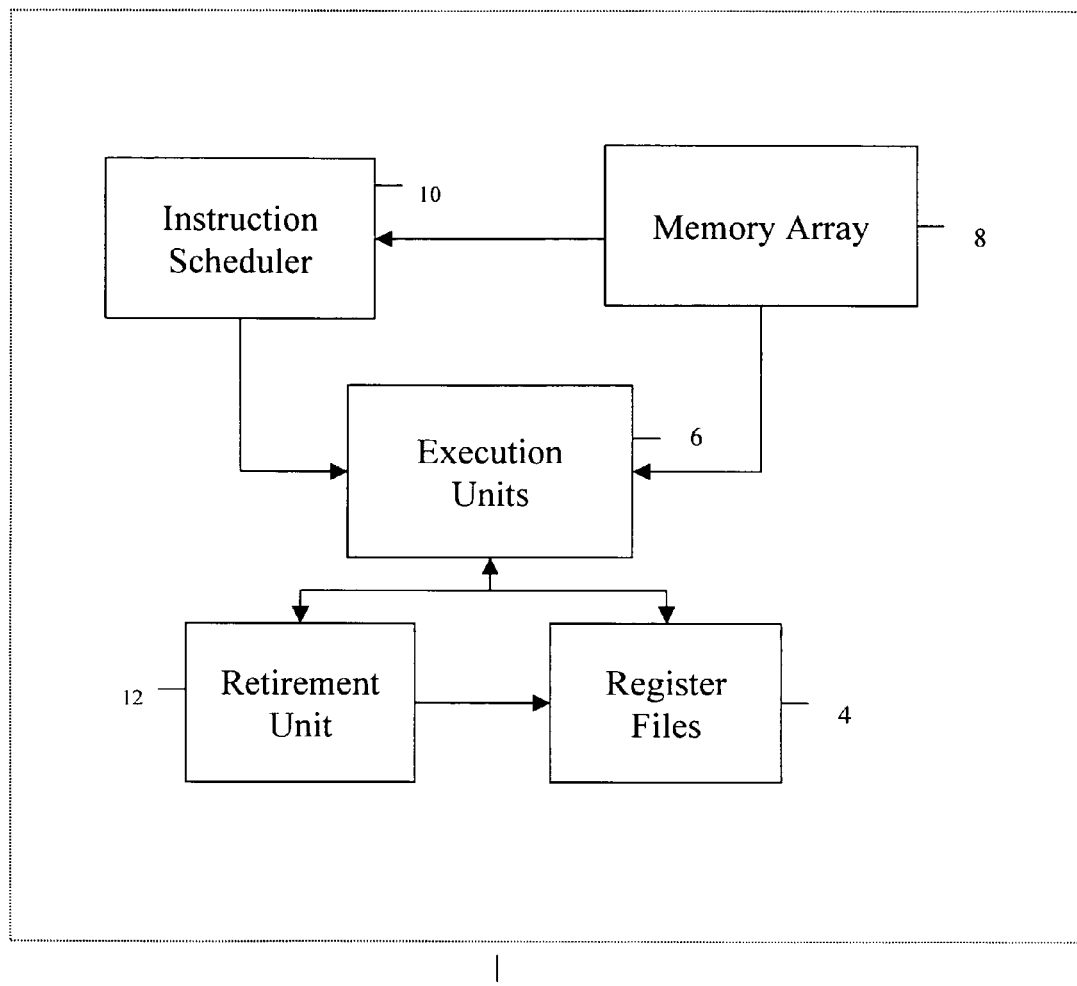
FIG. 1 is a block diagram illustrating a microprocessor that is suitable for practicing the illustrative embodiment of the present invention.

FIG. 1 illustrates a microprocessor suitable for practicing the illustrative embodiment. The microprocessor 2 includes register files 4, execution units 6, a memory array 8, an instruction scheduler 10, and retirement unit 12. The microprocessor 2 is of the type designed to handle concurrent multiple instructions during a single processor execution cycle. The execution units 6 can execute instructions of different types. For example, the units 6 can access data from the memory unit 8, e.g., load and store instructions of a program, perform arithmetic operations, and control execution flow.

The register files 4 are used to store floating or fixed-point data. Also, the register files 4 contain information regarding the physical registers that are allocated for execution. Each physical register corresponds to an instance of a logical register. The retirement unit receives data from the execution units 6 regarding the execution of the instructions. The retirement unit 12 determines when it is safe to write results of each instruction into the register files 4. The register files 4 store the final results of the instructions executed by the execution units 6. However, the register files car directly receive or send from the execution units 6 executed data. The possibility of data being thrown out is high because exceptions or pipeline flushes may occur at any point in time. Thus, the retirement unit manages the exceptions and other possible computational processes for the register files.

The memory array 8 is used to store signals representing instructions of programs and data which are processed by the microprocessor 2. The programs may be types, including but not limited to, operating system programs and application programs.

Also, the instruction scheduler 10 receives as input the instructions stored in the memory array 8. The instruction scheduler schedules the received instructions for processing by the execution units 6. Also, the instruction scheduler 10 receives retirement information from the retirement unit 12 for scheduling instructions based on when it is safe to write into the register files 4.

Figure 2A:
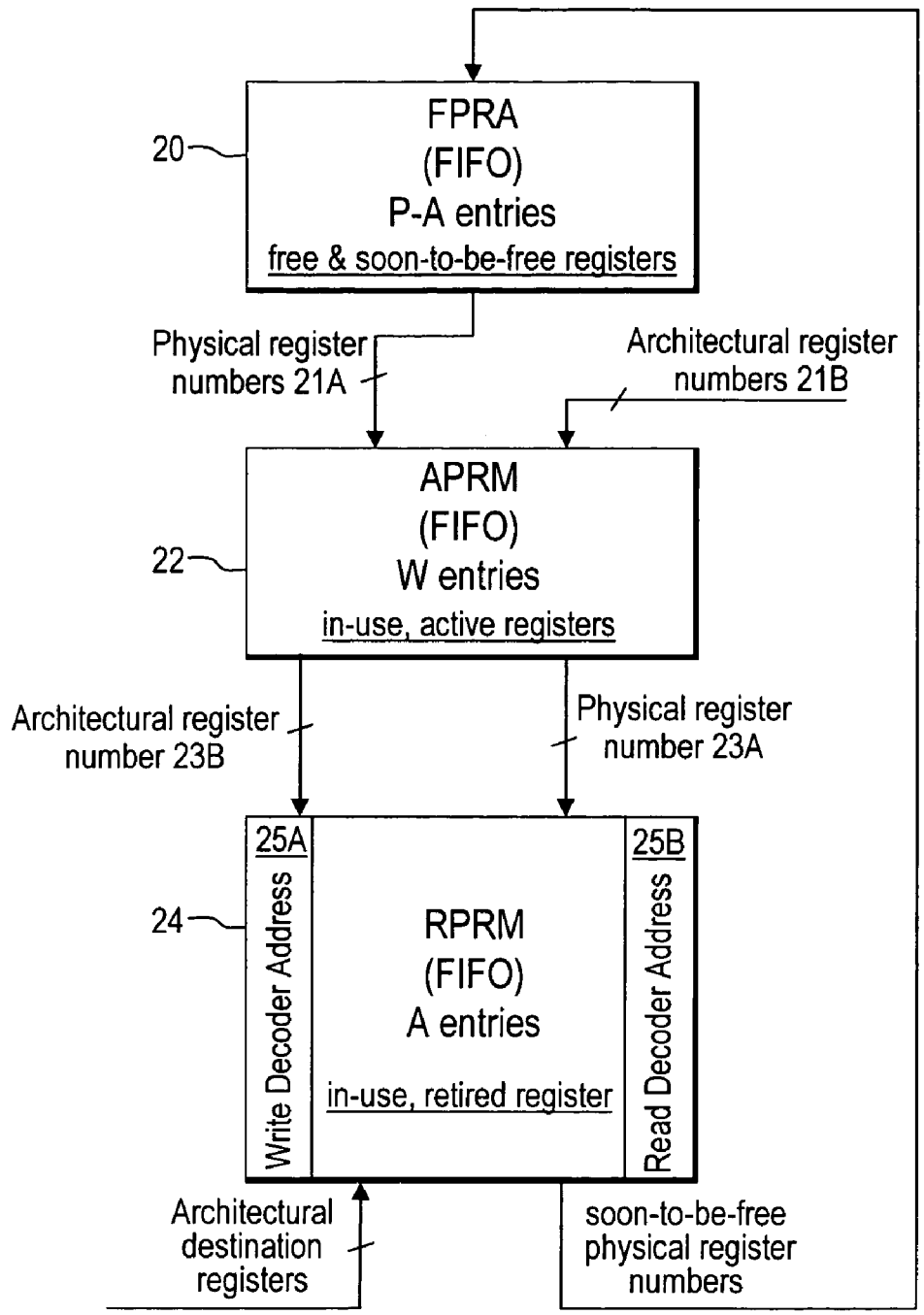
FIG. 2A illustrates a block diagram of the memory array elements used in the present invention.

FIG. 2A illustrates a block diagram of the memory array elements used in the present invention. The microprocessor 2 has a number of A architectural registers, P number of supported physical registers, and W maximum number of instructions that may be active (i.e., scheduled to execute or currently executing) in the processor 2 at any given time. For illustrative purposes P is 180, A is 116, and W is 128.

Furthermore, a typical microprocessor instruction may be of the following form:

ADD R1, R2->R3

In this case, the instruction adds two values together (R1 and R2) and stores the result in R3. The values being added together, R1 and R2, are referred to as source operands, while R3 is referred to as the destination register. R1, R2, and R3 are architectural register pointers that do not have a fixed correlation with a physical register in the processor 2.

For each incoming instruction into the instruction scheduler unit 10, that requires a destination register, specific physical registers within the processor's register files 4 must be assigned to store the results of each instruction, i.e., acts as the temporary holding cell for each resultant value. The process of assigning physical registers to temporarily hold the values referenced by an architectural register is referred to as "register mapping". Within the instruction scheduling unit, there are three structures used to perform this register mapping process, to track these mappings as instructions progress through the processor, and also to ensure that each physical register is reused when it is no longer needed.

The first of these structures is the Free Physical Register Array 20 (FPRA) 20. The FPRA 20 is a memory structure that keeps track of P-A registers that are not being used, and are thus "free" or "soon-to-be-free" or available to be used as a destination register. The FPRA 20 therefore provides a physical register number for each instruction that requires a destination register. Once a physical register is assigned, or mapped, it is no longer considered "free" because it is now "in-use".

The assigned physical register number 21A, along with its corresponding architectural register number 21B, are sent to the Active Physical Register Mapper (APRM) 22. The APRM 22 is a memory structure that stores the architectural to physical destination register mapping information for each of the W instructions that are currently active in the processor. The primary purpose of the APRM 22 is to act as a FIFO style buffer, (i.e., mapping information is read from the APRM 22 in the same order in which it was written).

Once an instruction has retired, i.e., it has moved through the execution unit and its results have been written into the register file (thus updating the formal state of the processor), the mapping information (architectural register numbers 23A and physical register numbers 23B) of that instruction's destination register that resides in the APRM 22 is then moved to the Retired Physical Register Mapper (RPRM) 24. The RPRM 24 is a memory structure that stores the architectural to physical destination mapping information for each of the A supported architectural registers. The RPRM 24 is organized as a RAM (random access memory) structure that stores physical register numbers 23B, and is indexed by the architectural register number 23A by way of a write decoder 25A in the RAM. Therefore, by sending the RPRM 24 an architectural register as an address to a read address decoder 25B, the RPRM 24 provides the corresponding physical register to which the architectural register is mapped.

Each time an instruction that uses a destination register enters the instruction scheduling unit, the previous contents of that destination register will be overwritten when that instruction retires. Therefore, the contents of the physical register that is being used to store the value of that architectural register will soon be obsolete and can therefore be moved to the FPRA 20 and marked as "soon-to-be-free". Once the instruction that overwrites this value retires, making the overwriting officially complete, the "soon-to-be-free" register in the FPRA 20 becomes a "free" register. Thus, the physical register can be re-used as a destination register. Therefore, the FPRA 20 essentially acts as a FIFO buffer with "soon-to-be-free" registers being rewritten into the FPRA 20, and then being read out of the FPRA 20 as "free registers" in the same order.

For a multi-threaded processor, the mapping information capacity of the FPRA and the RPRM must be increased to provide one full set of mappings for each supported thread. But the APRM need not be duplicated regardless of the number of supported threads.

Furthermore, the contents of the FPRA 20 and the RPRM 24 must be intialized at power-up such that one reference to each of the P supported physical registers is found in one or the other of these two structures. Likewise, the contents of the APRM 22 must be invalidated at power-up such that it contains no valid mapping information.

Figure 2B:
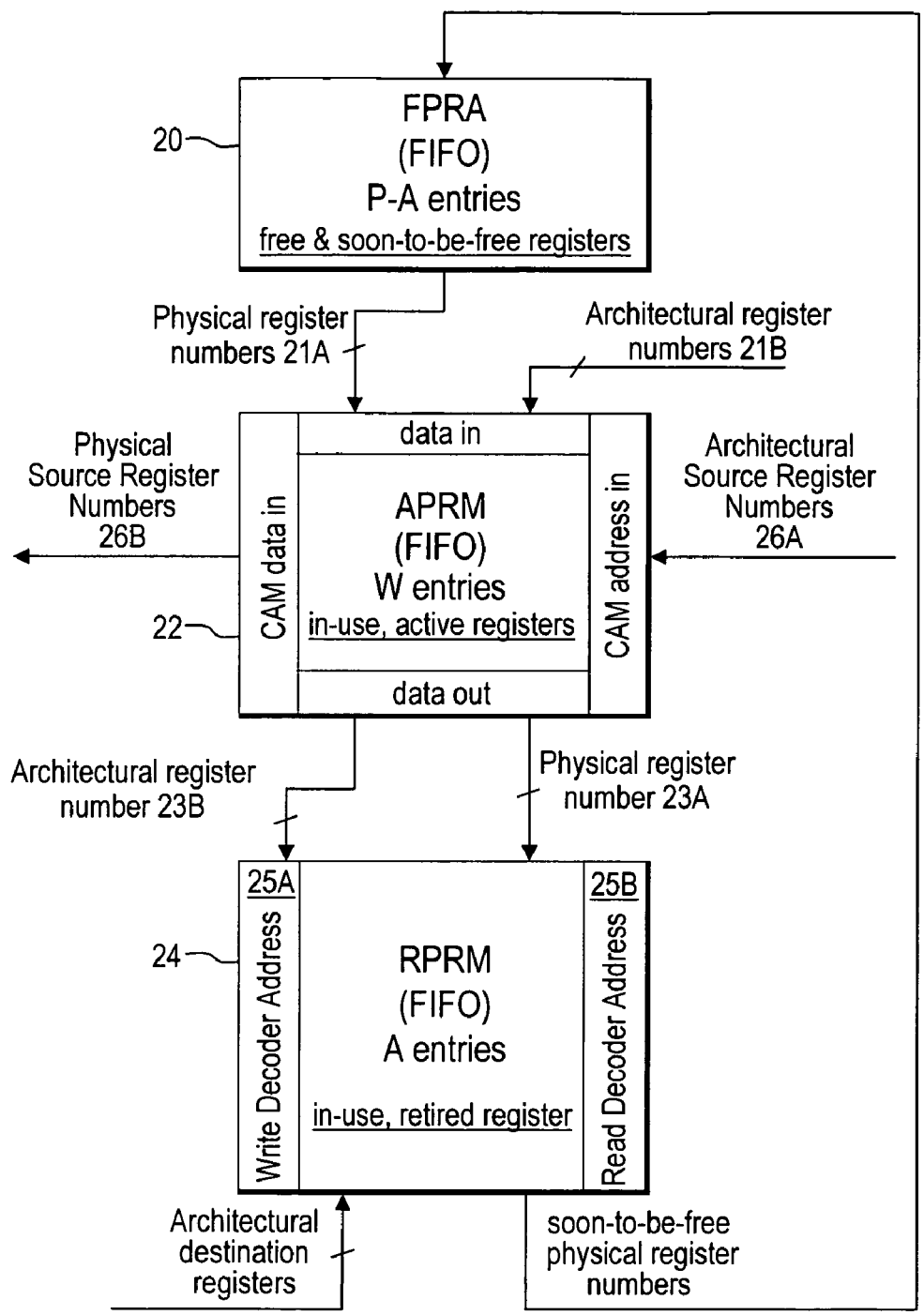
FIG. 2B illustrates another illustrative use of the APRM and RPRM structures in the present invention.

FIG. 2B illustrates another use of the APRM 22 and RPRM 24 memory structures. These two memory structures can also be designed to support a secondary function to help increase the efficiency of the instruction scheduler unit 10. The APRM 22 can also act as a CAM (content addressable memory) to provide register mapping information (physical register number 21A and architectural register number 21B) of instructions that are currently active in the pipeline. This function is useful for finding the physical register locations for an instruction's source operands. For example, if an incoming instruction uses an architectural register number 26A such as the $5^{th}$ architecture register (R5) as an operand, the value '5' can be sent to the APRM 22 CAM, which will then provide the physical register source number 26B mapped to the $5^{th}$ architectural register if R5 is the destination register of an instruction that is currently active in the processor.

At the same time, the architectural register number 26A value can be sent to the RPRM 24, which will return the physical register number 26B for the architectural register. If no mapping information is found in the APRM 22, then it can safely assume that the the instruction that provided the value stored has been retired, and the mapping information from the RPRM 24 should be used instead. In this way, the APRM 22 and the RPRM 24 can work together to provide the physical register pointers that are being used to stored the source operands for each new incoming instruction.

Figure 3:
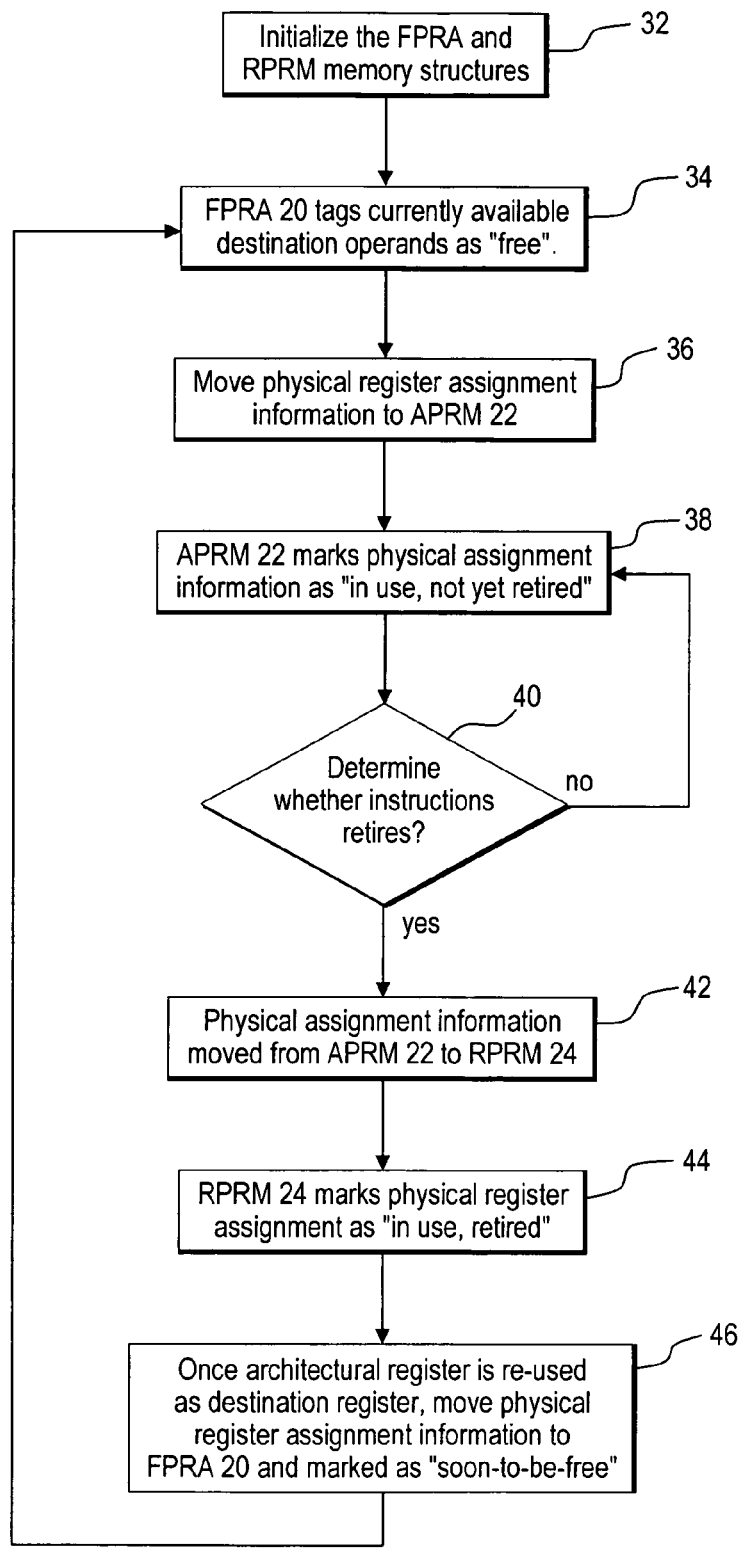
FIG. 3 is a flowchart diagram illustrating the inventive memory structures tracking and recycling of physical registers.

FIG. 3 is a flowchart illustrating the inventive memory structures tracking and recycling of physical registers. As stated above, the FPRA 20 tracks 64 of the 180 physical registers. The FPRA 20 and RPRM 22 memory structures are initialized for processing as shown in step 32. The FPRA 20 tags each of its physical registers as "free", meaning that they were currently available for use as a destination operand. The physical registers in FPRA 20 can also be tagged as "soon to be free", meaning that they are no longer in use and will soon be free once the speculative conditions which initiated the change in status are confirmed to be correct as shown as step 34. Once a physical register has been assigned as a destination operand by the FPRA 20, that register assignment information is moved to the APRM 22 as shown in step 36. Essentially, the APRM 22 tracks the physical register assignment information for instructions that are currently in the execution pipeline. The physical registers stored in the APRM 22 are marked as "in use, not yet retired" as shown in step 38.

The microprocessor 2 determines whether an instruction has retired from the execution pipeline as shown in step 40. If the instruction retires from the execution pipeline, the physical register assignment information moves from the APRM 22 to the RPRM 24 as shown in step 42. Otherwise, the APRM 22 maintains the physical assignment information. The RPRM 24 tracks physical register information for 116 registers. The physical registers in the RPRM 24 are essentially marked as "in-use, retired" as shown in step 44. Once an architectural register in the RPRM 24 is re-used as a destination register, the corresponding physical register is no longer "in-use". Subsequently, the physical register is moved from the RPRM 24 to the FPRA 20, and the FPRA 20 marks these physical registers as "soon to be free". When the architectural register is officially overwritten, the contents of the "soon-to-be-free" register in the FPRA 20 become obsolete and the physical register is then marked as "free". Subsequently, this makes the physical register available for use by another instruction as shown in step 46.

Numerous modifications and alternative embodiments of the invention will be apparent to those skilled in the art in view of the foregoing description. Accordingly, this description illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

Having thus described the invention, what is claimed as new and protected by Letters Patent is:

1. In a microprocessor having a plurality of physical registers, a method for managing said plurality of physical registers, said method comprising steps of:

providing a first structure for holding information identifying available physical registers that are free to be assigned as a destination operand for instructions executing on the microprocessor, said destination operand identifying where data resulting from an operation is to be stored;

storing a physical register assignment in a second structure noting that a selected one of the physical registers is assigned as a destination operand for an architectural register of a selected instruction executing on the microprocessor;

transferring said physical register assignment of said selected physical register from said second structure to a third structure after retirement of said selected instruction, the third structure holding information regarding a plurality of physical register assignments;

assigning said architectural register as a destination operand for a subsequent instruction; and prior to the retirement of said subsequent instruction, transferring information identifying said selected physical register as soon-to-be available from said third structure to said first structure.

2. The method as recited in claim 1 further comprising the step of storing mappings of logical registers to said plurality of physical registers.

3. The method as recited in claim 2 wherein the microprocessor is comprised of a memory array and wherein said method further comprises the step of storing said mappings to the memory array.

4. The method as recited in claim 1 wherein said microprocessor simultaneously executes multiple threads.

5. The method as recited in claim 1 wherein contents of said first structure, second structure, and third structure are self-initialized to store mappings of said physical registers.

6. The method as recited in claim 1 wherein contents of said assigned available physical registers are flushed from said assigned available physical registers.

7. The method as recited in claim 1 further comprising the step of detecting whether said assigned available physical registers are being utilized by said microprocessor for execution.

8. The method as recited in claim 1 wherein said method is performed by hardware.

9. The method as recited in claim 1 wherein said method is performed by software.

10. In a microprocessor having a plurality of physical registers, a method for managing said plurality of physical registers, said method comprising steps of:

providing a first structure for holding information identifying available physical registers that are free to be assigned to a plurality of destination operands for instructions executing on the microprocessor, said plurality of destination operands identifying where data resulting from an operation is to be stored;

storing a physical register assignment in a second structure noting that a selected one of the physical registers is assigned to one of said plurality of destination operands for an architectural register of a selected instruction executing on the microprocessor;

providing a third structure for holding information regarding physical registers utilized during execution of instructions;

transferring said physical register assignment of said selected physical register from said second structure to a third structure after retirement of said selected instruction;

assigning said architectural register as a destination operand for a subsequent instruction; and prior to the retirement of said subsequent instruction, transferring information identifying said selected physical register as soon-to-be available from said third structure to said first structure.

11. The method as recited in claim 10 further comprising the step of storing a plurality of mappings of logical registers to said plurality of physical registers.

12. The method as recited in claim 11 wherein the microprocessor is comprised of a memory array and wherein said method further comprises the step of storing said mappings to the memory array.

13. The method as recited in claim 10 wherein said microprocessor simultaneously executes multiple threads.

14. The method as recited in claim 10 wherein contents of said first structure, second structure, and third structure are self-initialized to store mappings of said physical registers.

15. The method as recited in claim 10 wherein contents of said assigned available physical registers are flushed from said assigned available physical registers.

16. The method as recited in claim 10 further comprising the step of detecting whether said assigned available physical registers are being utilized by said microprocessor for execution.

17. The method as recited in claim 10 wherein said method is performed by hardware.

18. The method as recited in claim 10 wherein said method is performed in software.

19. A microprocessor system with a plurality of physical registers for managing a plurality of physical register assignments comprising:

a first module for providing a first structure for holding information identifying available physical registers that are free to be assigned as a destination operand for instructions executing on the microprocessor, said destination operand identifying where data resulting from an operation is to be stored;

a second module for storing a physical register assignment in a second structure noting that a selected one of the physical registers is assigned as a destination operand for an architectural register of a selected instruction executing on the microprocessor;

a third module for providing a third structure for holding information regarding physical registers utilized during execution of instructions;

a first interface for transferring said physical register assignment of said selected physical register front said second structure to said third structure after retirement of said selected instruction; and a second interface for transferring information identifying said selected physical register as soon-to-be available from said third structure to said first structure subsequent to assignment of said architectural register as a destination operand for a subsequent instruction and prior to the retirement of said subsequent instruction.

20. The microprocessor as recited in claim 19 wherein said microprocessor simultaneously executes multiple threads.

* * * * *